(12) United States Patent
Kolesinski et al.

(10) Patent No.: US 11,315,434 B2
(45) Date of Patent: *Apr. 26, 2022

(54) SYSTEM AND METHOD TO CHANGE SVS MODE

(71) Applicant: Rockwell Collins, Inc., Cedar Rapids, IA (US)

(72) Inventors: Marcin Kolesinski, Central City, IA (US); Jason Davis, Marengo, IA (US); Patrick D. McCusker, Walker, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 242 days.

This patent is subject to a terminal disclaimer.

(21) Appl. No.: 16/670,788

(22) Filed: Oct. 31, 2019

(65) Prior Publication Data

US 2022/0051578 A1 Feb. 17, 2022

(51) Int. Cl.
*G08G 5/06* (2006.01)
*B64D 45/00* (2006.01)
*G08G 5/00* (2006.01)

(52) U.S. Cl.
CPC ............ *G08G 5/065* (2013.01); *B64D 45/00* (2013.01); *G08G 5/006* (2013.01); *G08G 5/0021* (2013.01); *G08G 5/0065* (2013.01)

(58) Field of Classification Search
CPC ...... G01C 23/005; G01C 21/20; G01C 21/30; G01C 21/005; G08G 5/065; G08G 5/0017; G08G 5/0078

(Continued)

(56) References Cited

U.S. PATENT DOCUMENTS 7,286,062 B2 10/2007 Feyereisen et al.
7,375,678 B2 5/2008 Feyereisen et al.
(Continued)

FOREIGN PATENT DOCUMENTS

EP 2610590 B1 10/2015
EP 3446984 A1 2/2019
(Continued)

OTHER PUBLICATIONS

Aspects of synthetic vision display systems and the best practices of the NASA's SVS project; RV Parrish, RE Bailey, LJ Kramer, DR Jones . . . - . . . Research Center TP . . . (year:2008)—core.ac.uk.*
(Continued)

*Primary Examiner* — Cuong H Nguyen
(74) *Attorney, Agent, or Firm* — Suiter Swantz pc llo

(57) ABSTRACT

A system may include a display and a processor communicatively coupled to the display. The processor may be configured to: output, to the display, a synthetic vision system (SVS) taxi mode exocentric view of an aircraft while the aircraft is performing taxi operations, while the aircraft is on ground, and when the aircraft is not in a predetermined exclusion zone, the predetermined exclusion zone including portions of a runway where the aircraft is able to begin taking off; and output, to the at least one display, an SVS flight mode egocentric view from the aircraft when the aircraft is in the predetermined exclusion zone. The display may be configured to display the SVS taxi mode exocentric view until the aircraft is in the predetermined exclusion zone and display the SVS flight mode egocentric view when the aircraft is in the predetermined exclusion zone.

11 Claims, 10 Drawing Sheets

(58) Field of Classification Search
USPC .... 701/120, 16, 10; 340/972, 979, 945, 971, 340/7
See application file for complete search history.

(56) References Cited

U.S. PATENT DOCUMENTS

| | | | |
|---|---|---|---|
| 7,499,794 B1 * | 3/2009 | Bailey | G01C 23/005 340/961 |
| 7,965,223 B1 | 6/2011 | McCusker | |
| 8,159,416 B1 | 4/2012 | Yum et al. | |
| 8,193,948 B1 | 6/2012 | Shapiro et al. | |
| 8,279,108 B2 * | 10/2012 | Nouvel | G08G 5/0021 342/29 |
| 8,396,616 B1 * | 3/2013 | Barber | G08G 5/0021 701/14 |
| 8,433,459 B2 | 4/2013 | Michel et al. | |
| 8,698,654 B2 | 4/2014 | He | |
| 8,786,467 B2 | 7/2014 | Clark et al. | |
| 9,105,115 B2 | 8/2015 | Feyereisen et al. | |
| 9,189,964 B1 | 11/2015 | Rathinam et al. | |
| 9,347,794 B1 | 5/2016 | Tiana et al. | |
| 9,517,844 B2 | 12/2016 | Khatwa et al. | |
| 9,786,467 B2 | 10/2017 | Iijima | |
| 10,001,376 B1 * | 6/2018 | Tiana | G01C 23/005 |
| 10,234,303 B1 | 3/2019 | Chandrashekarappa et al. | |
| 2010/0060510 A1 * | 3/2010 | Nouvel | G08G 5/0021 342/29 |
| 2010/0283636 A1 | 11/2010 | Clark et al. | |
| 2012/0194556 A1 | 8/2012 | Schmitt et al. | |
| 2013/0057414 A1 * | 3/2013 | Nutaro | G08G 5/0021 340/958 |
| 2013/0131888 A1 * | 5/2013 | Nutaro | G08G 5/065 701/1 |
| 2013/0169450 A1 * | 7/2013 | He | G01C 23/005 340/971 |
| 2013/0231853 A1 | 9/2013 | Feyereisen et al. | |
| 2019/0004318 A1 | 1/2019 | Descheemaeker et al. | |
| 2019/0056611 A1 | 2/2019 | Marhefka et al. | |
| 2019/0066523 A1 | 2/2019 | Pesik et al. | |
| 2020/0116521 A1 | 4/2020 | Barber et al. | |
| 2021/0183258 A1 | 6/2021 | Davis et al. | |

FOREIGN PATENT DOCUMENTS

| | | | |
|---|---|---|---|
| EP | 3476743 A1 | 5/2019 | |
| EP | 3816972 A1 * | 5/2021 | G01C 23/00 |
| EP | 3819896 A1 * | 5/2021 | B64D 43/00 |
| RU | 2550887 C2 * | 5/2015 | |

OTHER PUBLICATIONS

Validation of an innovative experimental safety assessment for virtual control tower HMI designs; L Meyer, M Schultz, H Fricke—Proceedings Sesar Innovation Days,—sesarju.eu (printed from https://www.sesarju.eu/sites/default/files/documents/sid/2011/SID%202011-21%20new.pdf) (Year: 2011).*

Situation Awareness Catches On: What? So What? Now What?; YJ Tenney, RW Pew—Situational Awareness,—taylorfrancis.com (Year: 2017).*

Pilot Cueing for 360 Obstacle Awareness During DVE Missions; G Hartnett, J Hicks, D Durbin, M Godfroy-Cooper . . . -)—apps.dtic.mil (Year: 2020).*

"Charlie," development of a light-weight, virtual reality trainer for the LSO community: time to make the leap toward immersive VR, LC Greunke—(Year:2015)—apps.dtic.mil.*

Richard Boll's "Runway Declared Distance Information Provided on Airport Charts and in Navigation Databases" (from https://www.faa.gov/air_traffic/flight_info/aeronav/acf/media/Presentations/06-01-RD181-Runway_Declared_Distances_Presentation.pdf—Apr. 19, 2006).*

P. Snow, K. Alter and R. C. Davis, "Challenges of reducing landing minima and enabling single-pilot operations through the use of synthetic vision/highway-in-the-sky technologies," 24th Digital Avionics Systems Conference, 2005, p. 11 pp. vol. 2-, doi: 10.1109/DASC.2005.1563435. (Year: 2005).*

"Runway Declared Distance Info Provided on Airport Charts and in Navigation Database" by Richard Boll, a presentation on Apr. 19, 2006—Aeronautical Charting Forum. (Year: 2006).*

Trip Planning for Electric Vehicle through Optimal Driving using Genetic Algorithm, by Mousumi Karmakar et al., IEEE Inter Conf on Power Electronics, Intelligent Control and Energy Systems (ICPEICES-2016) (Year: 2016).*

Extended Search Report for European Application No. 20205272.6 dated Mar. 30, 2021, 9 pages.

Parrish Russell Vet al: "Aspects of Synthetic Vision Display Systems and the Best Practices of the NASA's SVS Project", May 1, 2008 (May 1, 2008), XP055786454, Retrieved from the Internet: URL:https://ntrs.nasa.gov/api/citations/20 080018605/downloads/20080018605.pdf?attachment=true [retrieved on Mar. 17, 2021] * the whole document*.

U.S. Appl. No. 16/670,788, filed Oct. 31, 2019, Marcin Kolesinski.
U.S. Appl. No. 16/675,999, filed Nov. 6, 2019, Marcin Kolesinski.
U.S. Appl. No. 16/687,858, filed Nov. 19, 2019, Matt Myers.

"G3X Pilot's Guide," Apr. 29, 2019 (Apr. 29, 2019), XP055790149, Retrieved from the Internet: URL:https://static.garmin.com/pumac/190-01 115-00_q.pdf [retrieved on Mar. 25, 2021].

Extended Search Report for European Application No. 20208733.4 dated May 6, 2021, 9 pages.

Extended Search Report for European Application No. 20213923.4 dated May 6, 2021, 9 pages.

* cited by examiner

SYSTEM AND METHOD TO CHANGE SVS MODE

BACKGROUND

The traditional synthetic vision system (SVS) scenery, which is used as a background for a primary flight display, provides an egocentric view of an area in front of an aircraft. This provides a relatively narrow field of view which is sufficient for take-off, flight, and landing operations; however, this view is not ideal for taxiing to a takeoff point on a runway.

SUMMARY

In one aspect, embodiments of the inventive concepts disclosed herein are directed to a system. The system may include a display and a processor communicatively coupled to the display. The processor may be configured to: output, to the display, a synthetic vision system (SVS) taxi mode exocentric view of an aircraft while the aircraft is performing taxi operations, while the aircraft is on ground, and when the aircraft is not in a predetermined exclusion zone, the predetermined exclusion zone including portions of a runway where the aircraft is able to begin taking off; and output, to the at least one display, an SVS flight mode egocentric view from the aircraft when the aircraft is in the predetermined exclusion zone. The display may be configured to display the SVS taxi mode exocentric view until the aircraft is in the predetermined exclusion zone and display the SVS flight mode egocentric view when the aircraft is in the predetermined exclusion zone.

In a further aspect, embodiments of the inventive concepts disclosed herein are directed to a method. The method may include: outputting, to a display, a synthetic vision system (SVS) taxi mode exocentric view of an aircraft while the aircraft is performing taxi operations, while the aircraft is on ground, and when the aircraft is not in a predetermined exclusion zone, the predetermined exclusion zone including portions of a runway where the aircraft is able to begin taking off; outputting, to the display, an SVS flight mode egocentric view from the aircraft when the aircraft is in the predetermined exclusion zone; displaying the SVS taxi mode exocentric view until the aircraft is in the predetermined exclusion zone; and displaying the SVS flight mode egocentric view when the aircraft is in the predetermined exclusion zone.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
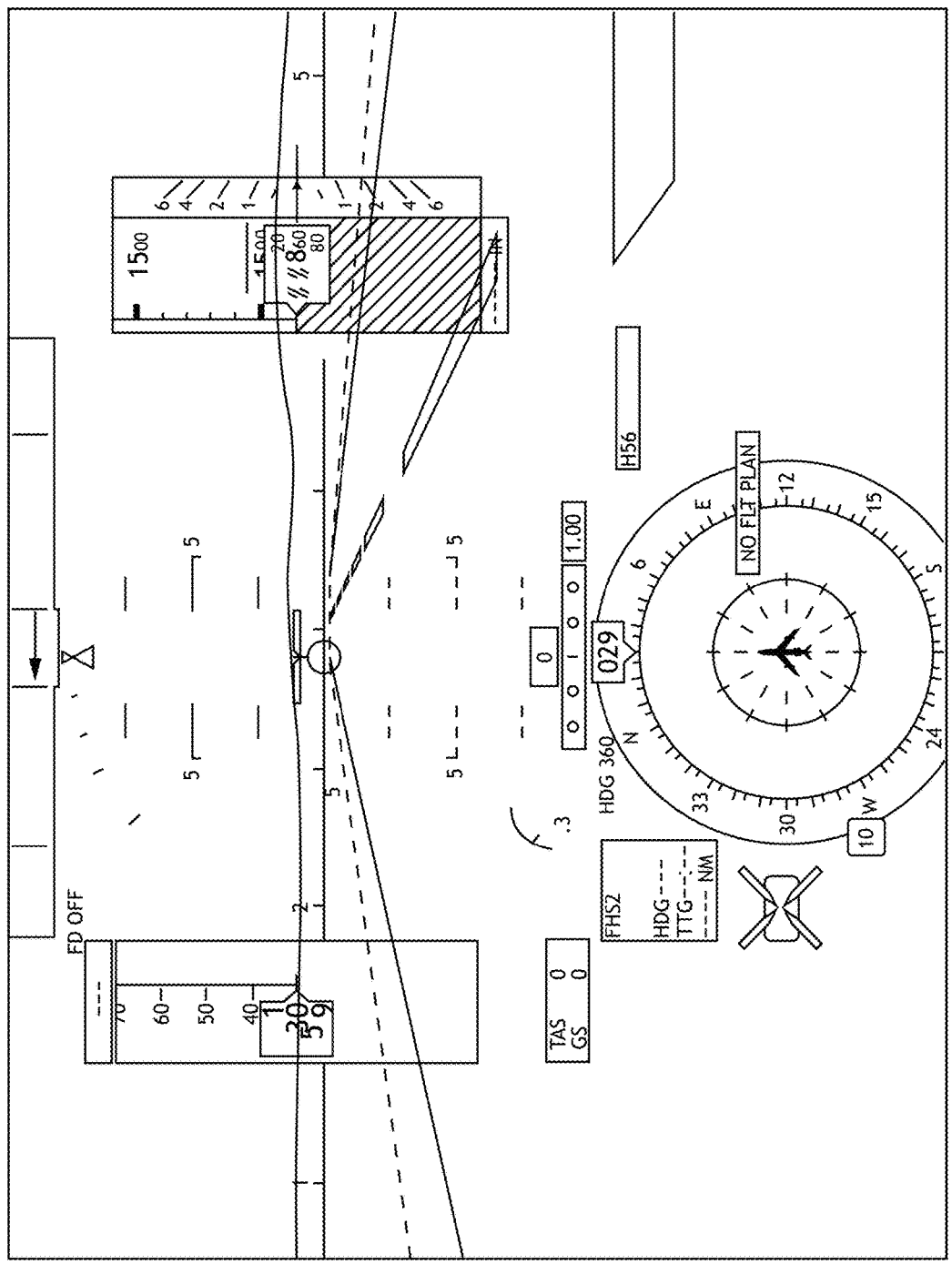
FIG. 1 is a view of an exemplary embodiment of an SVS flight mode egocentric view according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system and a method configured to display an SVS taxi mode exocentric view until an aircraft is in a predetermined exclusion zone and to display an SVS flight mode egocentric view when the aircraft is in the predetermined exclusion zone.

Referring now to FIG. 1, an exemplary embodiment of an SVS flight mode egocentric view 102 according to the inventive concepts disclosed herein is depicted. The SVS flight mode egocentric view 102 may be used as a background for a primary flight display (PFD) (e.g., 806 or 902) providing an egocentric view of the area in front of the aircraft (e.g., 306). The SVS flight mode egocentric view 102 may provide a relatively narrow (e.g., as compared to an SVS taxi mode exocentric view 202) field of view, which may be sufficient for take-off, flight, and landing operations. The SVS flight mode egocentric view 102 may be used during an SVS flight mode. The SVS flight mode egocentric view 102 may include primary flight display symbology.

Figure 2:
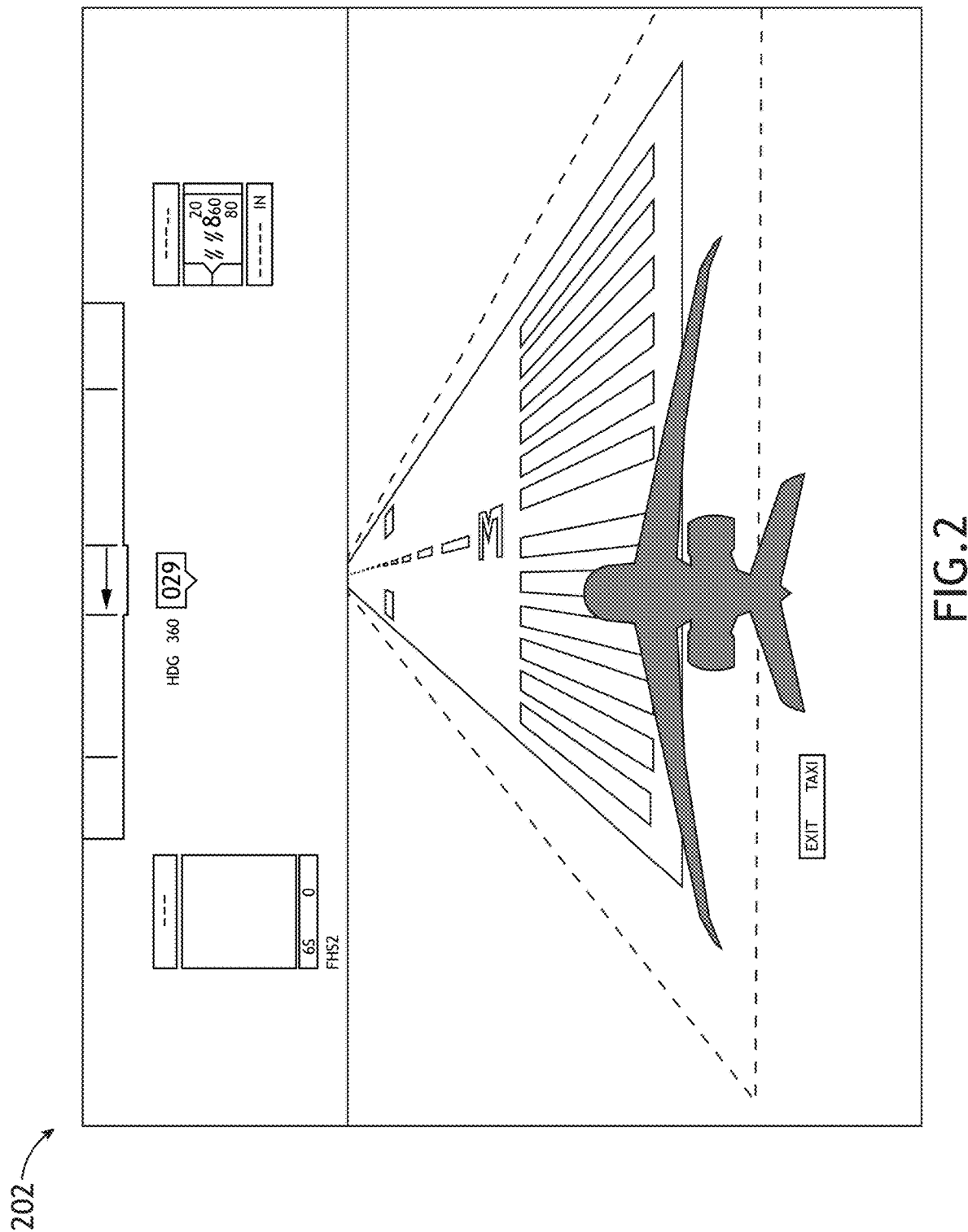
FIG. 2 is a view of an exemplary embodiment of an SVS taxi mode exocentric view according to the inventive concepts disclosed herein.

Referring now to FIG. 2, an exemplary embodiment of an SVS taxi mode exocentric view 202 according to the inventive concepts disclosed herein is depicted. The SVS taxi mode exocentric view 202 may provide a wider field of view than the SVS flight mode egocentric view 102 for use during taxi operations. The SVS taxi mode exocentric view 202 may be used during an SVS taxi mode. The SVS taxi mode exocentric view 202 may improve support for taxi operations. The SVS taxi mode exocentric view 202 may provide an exocentric view of an area surrounding the aircraft (e.g., 306). The eye-point of the synthetic imagery for the SVS taxi mode exocentric view 202 may be above and behind the aircraft. The SVS taxi mode exocentric view 202 may expand the field of view of the synthetic scenery. The location of the aircraft (e.g., 306) within this scene may be represented by an aircraft outline projected onto the ground in the synthetic scene with the aircraft within the outline shown as transparent or translucent.

The SVS taxi mode exocentric view 202 may declutter much of the PFD symbology to emphasize the synthetic view of the world around the aircraft (e.g., 306) such that the SVS taxi mode exocentric view 202 may have less of the PFD symbology than the SVS flight mode egocentric view 102. Because of the decluttering of PFD symbology, the SVS taxi mode exocentric view 202 should only be used for taxi operations. The PFD should return to the SVS flight mode egocentric view 102 before or as the aircraft (e.g., 306) begins a take-off run. The PFD may have logic to determine when automatic transitions between Flight Mode and Taxi Mode may occur. This ensures the PFD is returned to a proper configuration prior to take-off.

A PFD format control performed by at least one processor (e.g., at least one processor 904 and/or at least one processor 1002) onboard the aircraft may provide the means to enable or disable SVS taxi mode operations (e.g., via a configuration selection of "Auto" or "Off"). The Auto selection may allow the PFD logic to determine when the PFD may show the SVS flight mode egocentric view 102 or the SVS taxi mode exocentric view 202. The Off selection may ensure that the SVS flight mode egocentric view 102 is always presented during taxi operations (within the logic that determines when SVS is operational or in a fault state). The flight crew may manually configure the PFD to SVS Taxi Mode Auto/Off via a menu selection on the PFD, via independent hardware or software control panels, or other user interfaces (e.g., an eye tracking user interface or a voice recognition system). The user interface for configuring SVS Taxi Mode Auto/Off may be designed to be selected once per flight during a normal start up routine.

In some embodiments, the SVS computing device (e.g., 810) may automatically transition from outputting the SVS taxi mode exocentric view 202 to the SVS flight mode egocentric view 102, for example, when the aircraft arrives at a hold line of a departure runway. There are several issues that may complicate this goal. First, long runways may have multiple intersections with taxi ways where the aircraft can begin the take-off run. Thus, there are many potential places where the aircraft can turn onto the runway to start the take-off run. Not all of these locations will be marked with hold lines. Some runways may have no marked hold lines at any taxiway/runway intersection. During taxi operations, the aircraft may cross one or more runways getting to the location to start the take-off run. At some airports, there may be only taxiways on one side of the runway. Thus, the aircraft may cross the departure runway to get to a taxiway that will lead to the departure point of the runway. In some cases, the aircraft may turn on to the runway and then taxi down the runway to the departure point before turning around and starting the take-off run.

Figure 3:
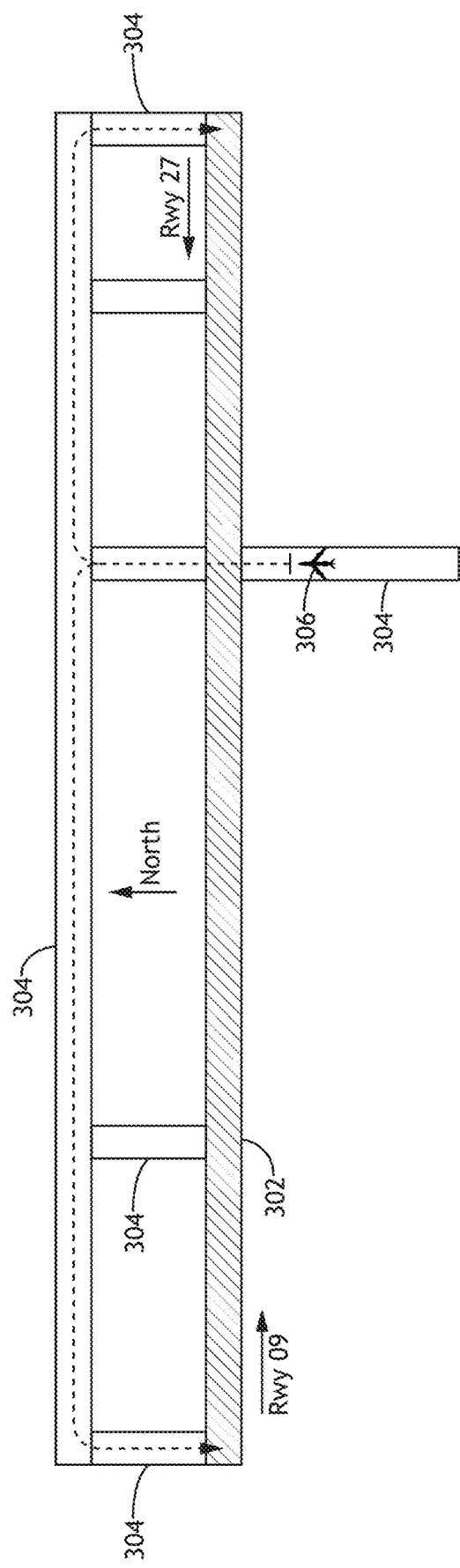
FIG. 3 is a view of an exemplary embodiment of an aircraft taxiing on a taxiway to a departure point on a runway according to the inventive concepts disclosed herein.

Referring now to FIG. 3, an exemplary embodiment of an aircraft 306 taxiing on a taxiway 304 to a departure point on a runway 302 according to the inventive concepts disclosed herein is depicted. In a most common scenario, the aircraft 306 may be at a hold line somewhere in the middle of the departure runway 302. The aircraft 306 may cross the runway 302 and taxi along the taxiway 304 to either end of the runway 302 to take-off. Note that any given runway 302 may be given two identifiers based on the magnetic heading the aircraft 306 is pointing down the runway. Thus, when taking off from the eastern end of the runway 302 towards the western end, the runway 302 may be identified as 27 (based on 270 degrees magnetic heading). The runway 302 may be labeled 09 (90 degrees magnetic heading) when taking off from the other direction.

Figure 4:
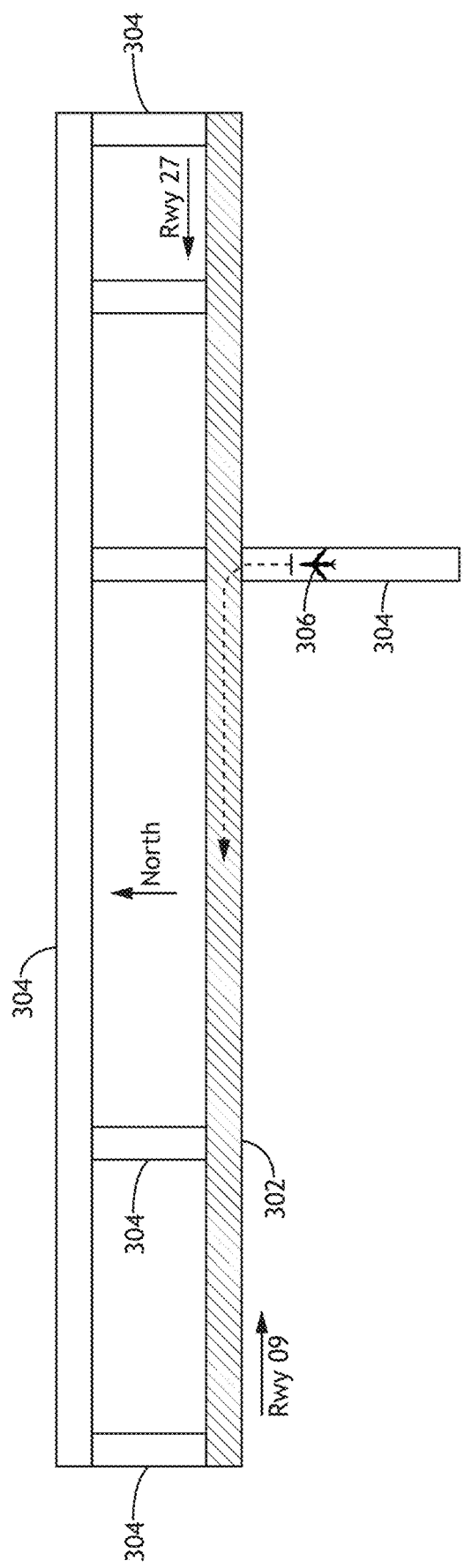
FIG. 4 is a view of an exemplary embodiment of an aircraft taxiing on a taxiway to a departure point on a runway according to the inventive concepts disclosed herein according to the inventive concepts disclosed herein.

Referring now to FIG. 4, an exemplary embodiment of an aircraft 306 taxiing on a taxiway 304 to a departure point on a runway 302 according to the inventive concepts disclosed herein is depicted. FIG. 4 shows a scenario which is not that uncommon with business jets. Business jets typically have higher thrust to weight ratios than air transport jet and require less available runway distance to complete the take-off. Thus, the business jet can enter the runway 302 at some mid-point and take off.

Figure 5:
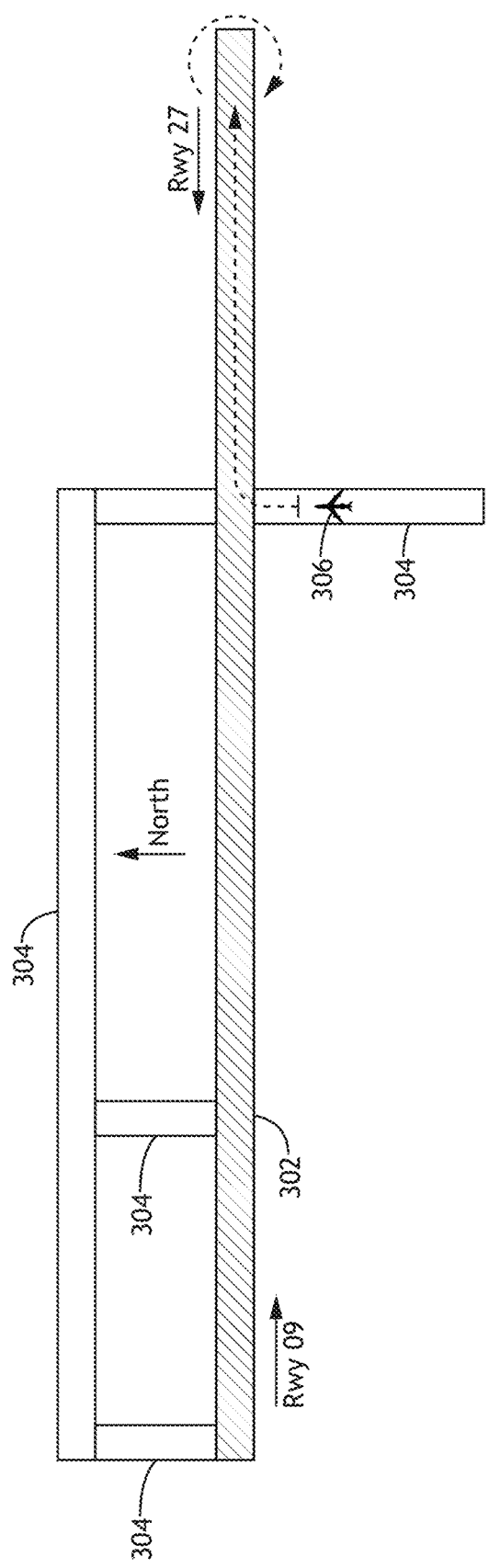
FIG. 5 is a view of an exemplary embodiment of an aircraft taxiing on a taxiway to a departure point on a runway according to the inventive concepts disclosed herein according to the inventive concepts disclosed herein.

Referring now to FIG. 5, an exemplary embodiment of an aircraft 306 taxiing on a taxiway 304 to a departure point on a runway 302 according to the inventive concepts disclosed herein is depicted. FIG. 5 shows a scenario that often occurs at small airports where the taxiways 304 do not go the full length of the runway 302. In this case, the aircraft 306 may enters the runway 302 and turn the opposite direction of the intended take off. The aircraft taxies to the end of the runway 302 and then turns around. From this point, the aircraft 306 performs a normal take off.

Figure 6:
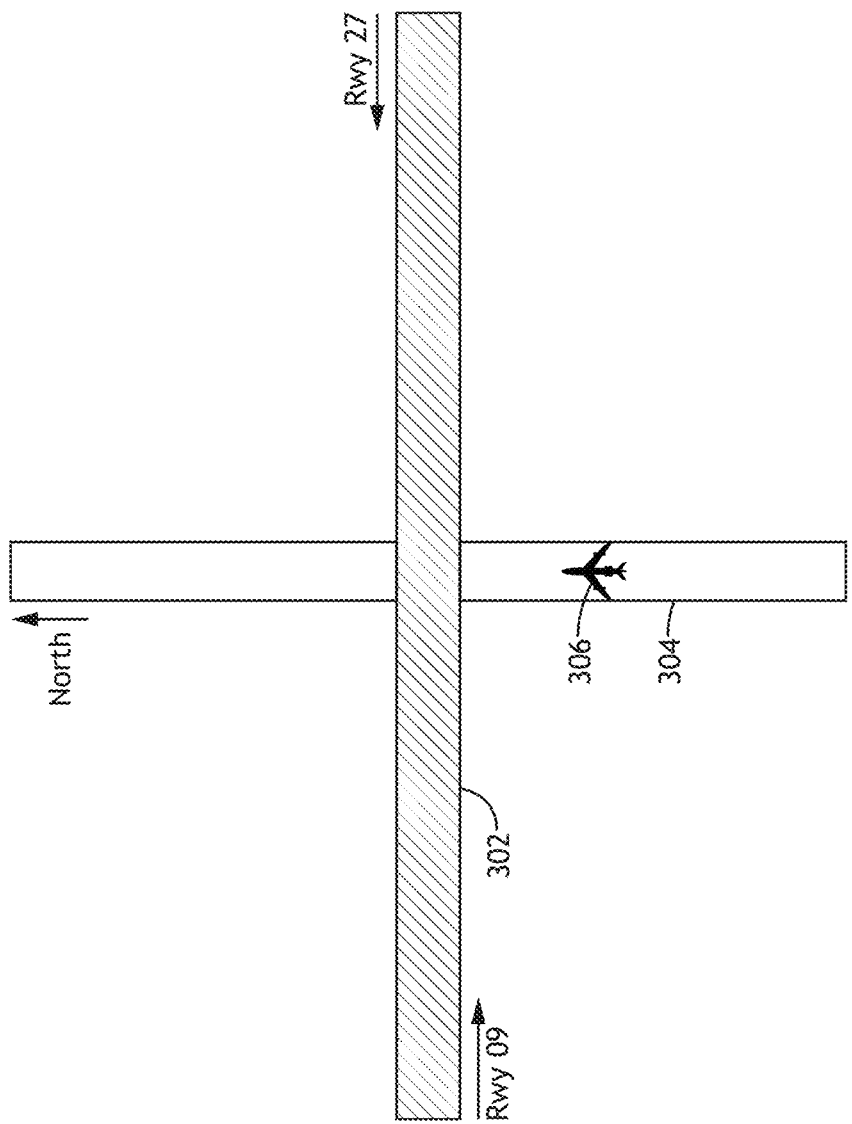
FIG. 6 is a view of an exemplary embodiment of an aircraft taxiing on a taxiway to a departure point on a runway according to the inventive concepts disclosed herein according to the inventive concepts disclosed herein.

Referring now to FIG. 6, an exemplary embodiment of an aircraft 306 taxiing on a taxiway 304 to a departure point on a runway 302 according to the inventive concepts disclosed herein is depicted.

With respect to the scenario shown in FIG. 4, it may be necessary for the SVS computing device to transition from Taxi Mode to Flight Mode. In the scenarios with respect to FIGS. 3 and 5, remaining in Flight Mode may be desirable until the aircraft 306 is at the hold lines at the end of the departing runway (first scenario depicted in FIG. 3) or as it turns around (in the third scenario in FIG. 5). The important question then is to determine the most appropriate action when the aircraft 306 is at any given hold line for the departing runway 302 or in close proximity to the runway 302 for those taxiway 304/runway 302 intersections that do not have painted hold lines.

Figure 7:
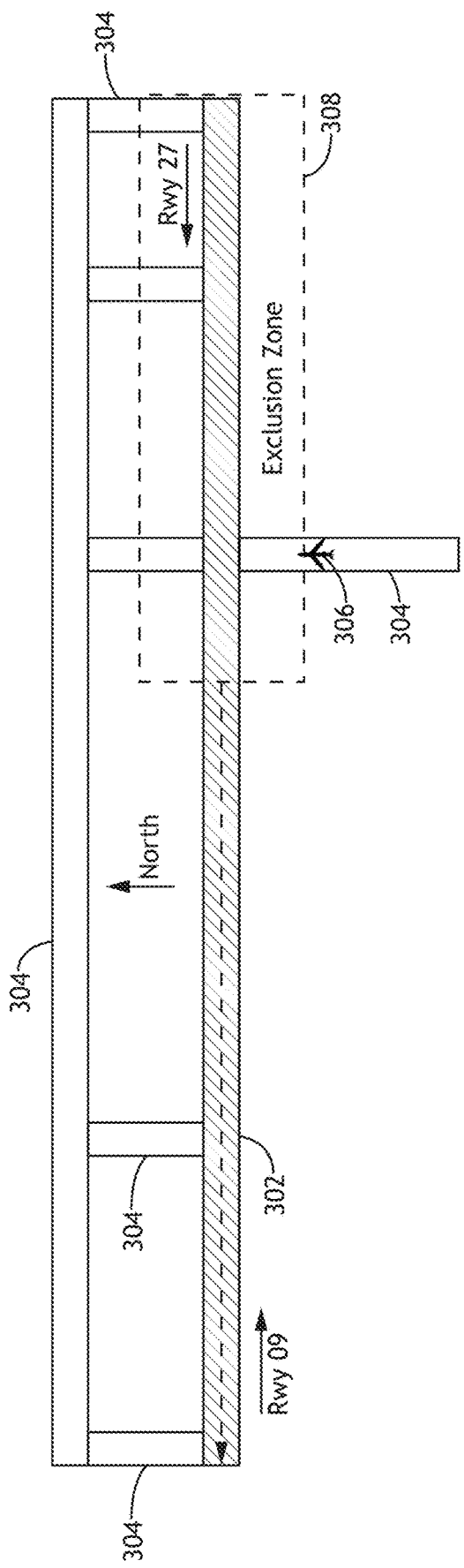
FIG. 7 is a view of an exemplary embodiment of an aircraft taxiing on a taxiway to a departure point on a runway with a predetermined exclusion zone according to the inventive concepts disclosed herein.

Referring now to FIG. 7, an exemplary embodiment of an aircraft 306 taxiing on a taxiway 304 to a departure point on a runway 302 with a predetermined exclusion zone 308 according to the inventive concepts disclosed herein is depicted. Some embodiments may be configured to determine (e.g., define and/or compute), by at least one processor, an exclusion zone 308, where the SVS computing device should be in flight mode regardless of other logic that may compute automatic transitions between flight mode and taxi mode. Notionally, this exclusion zone 308 may cover all of the runway surfaces from which the aircraft 306 can complete the take-off run and become airborne while leaving a margin of error at the end of the runway 302. In some embodiments, the exclusion zone 308 may include surfaces in addition to the runway, such as portions of taxiways 304. SVS flight mode may be required at all times when the aircraft 306 is in the exclusion zone 308. The exclusion zone 308 may cover a portion of the runway 302 from which the aircraft 306 can take off (e.g., portions of the runway where the remaining runway length is greater than the minimum required take-off distance from the end of the runway 302). The exclusion zone may cover an area from the runway center line where painted hold lines may exist, if present.

The minimum required take-off distance may be determined by at least one processor, as one or more of the following: defined as some fraction of runway length; defined as an aircraft-specific constant; or computed dynamically by a flight management system (FMS). The simplest calculation for the exclusion zone may be to take a fraction of the length of the runway 302 from the start of the runway 302; however, this solution may be impractical given the widely varying length of runways from which the aircraft 306 can operate. A more realistic solution may be to look at each aircraft type and determine a shortest take-off distance that that can be achieved under ideal conditions. This may define the largest possible exclusion zone for any given runway and any given aircraft. However, the largest possible exclusion zone may not be the preferred exclusion zone, because it is desirable to leave the SVS in taxi mode until it should transition to flight mode. A large exclusion zone is more likely to produce nuisance transitions from taxi mode to flight mode and then back to taxi mode as the aircraft crosses the runway 302 before following a taxiway 304. This solution can be fine-tuned by looking at the state of the aircraft 306 and the environmental conditions at the time of taxi. The heavier the aircraft 306 is, the longer the distance must be to take off. Thus, an aircraft fully loaded with fuel for a long trip with a fully-populated passenger compartment needs more runway than a minimally-loaded aircraft for a short hop. Additionally, the elevation of the airport, current temperature, and current air pressure may determine minimum speed needed to lift off which in turn may determine the minimum available runway distance to take off. These calculations are already performed by the FMS and are displayed to the flight crew. By communicating the FMS calculated data to the SVS, this information can be used to determine the actual required take-off distance for the current flight. This may allow the exclusion zone 308 to be reduced to the smallest possible size which reduces the probability of nuisance transitions.

Figure 8:
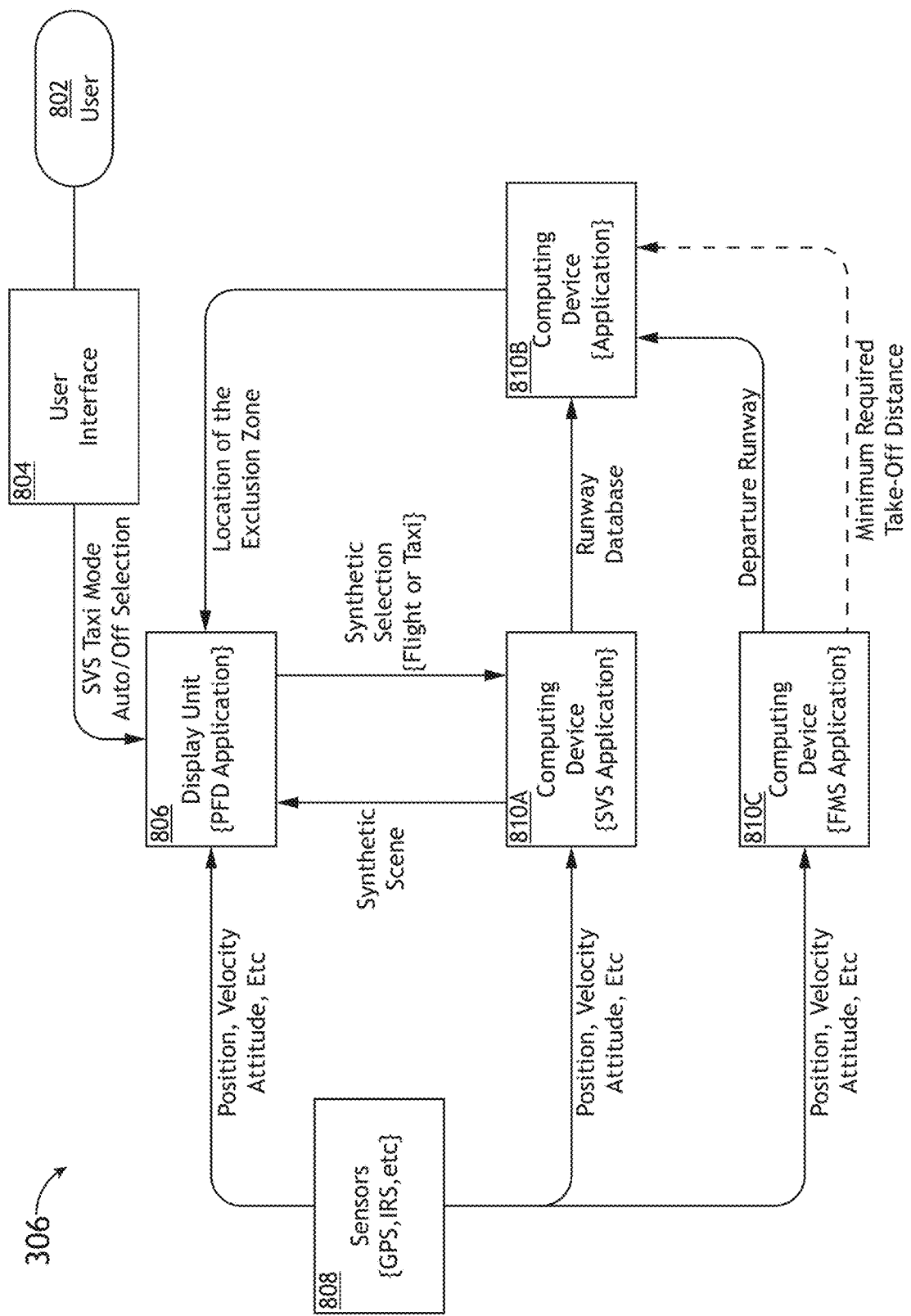
FIG. 8 is a view of an exemplary embodiment of a system according to the inventive concepts disclosed herein.
Figure 10:
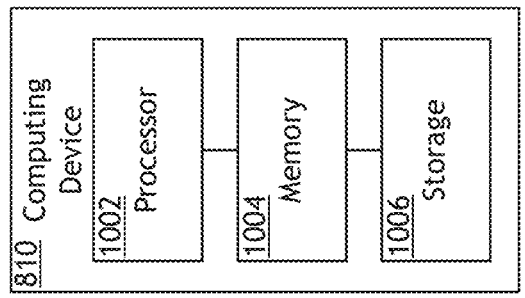
FIG. 10 is a view of an exemplary embodiment of a computing device of the system of FIG. 8 according to the inventive concepts disclosed herein.
Figure 9:
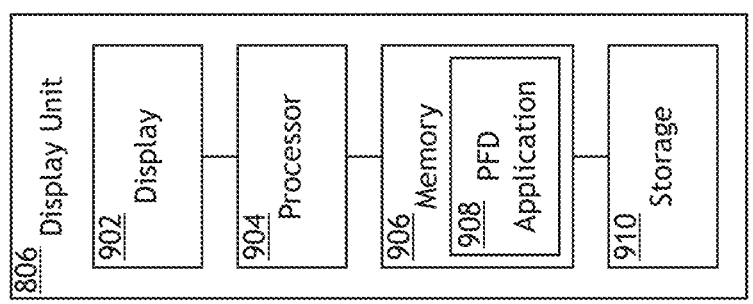
FIG. 9 is a view of an exemplary embodiment of a display unit computing device of the system of FIG. 8 according to the inventive concepts disclosed herein.

Referring now to FIG. 8-10, an exemplary embodiment of a system according to the inventive concepts disclosed herein is depicted. In some embodiments, the system may include the aircraft 306, which may include at least one user 802, at least one user interface 804, at least one display unit computing device 806, sensors 808, at least one computing device 810A, at least one computing device 810B, and/or at least one computing device 810C, some or all of which may be communicatively coupled at any given time. In some embodiments, the at least one display unit computing device 806, the at least one computing device 810A, the at least one computing device 810B, and/or the at least one computing device 810C may be implemented as a single computing device or any number of computing devices configured to perform any or all of the operations disclosed throughout.

The user 802 may be a pilot or crew member. The user 802 may be configured to interface with the system via the user interface 804, for example, to select SVS taxi mode to be Auto or Off. The at least one user interface 804 may be implemented as any suitable user interface, such as a touchscreen (e.g., of the display unit computing device 806 and/or another display unit), a multipurpose control panel, a cursor control panel, a keyboard, a mouse, a trackpad, a button, a switch, an eye tracking system, and/or a voice recognition system. The user interface 804 may be configured to receive a user selection and to output the user selection to a computing device (e.g., the display unit computing device 806). For example, a pilot of the aircraft 306 may be able to make an auto or off selection for a SVS taxi mode, wherein the auto selection of the SVS taxi mode enables at least one processor to automatically transition between the SVS taxi mode exocentric view 202 and the SVS flight mode egocentric view 102, wherein the off selection of the SVS taxi mode enables the at least one processor to only output the SVS flight mode egocentric view 102.

The display unit computing device 806 may be implemented as any suitable computing device, such as a PFD computing device. As shown in FIG. 9, the display unit computing device 806 may include at least one display 902, at least one processor 904, at least one memory 906, and/or storage 910, some or all of which may be communicatively coupled at any given time. The processor 904 may be configured to run various software applications (e.g., a PFD application 908) or computer code stored (e.g., maintained) in a non-transitory computer-readable medium (e.g., memory 906 and/or storage 910) and configured to execute various instructions or operations. The processor 904 may be configured to perform any or all of the operations disclosed throughout. The display 902 may be configured to: display the SVS taxi mode exocentric view 202 until the aircraft 306 is in the predetermined exclusion zone 308 and to display the SVS flight mode egocentric view 102 when the aircraft 306 is in the predetermined exclusion zone 308.

The sensors 808 may be any suitable sensors, such as at least one global positioning system (GPS) sensor, at least one inertial reference system (IRS) sensor, and/or any other sensors commonly installed in aircraft. The sensors 808 may be configured to output sensor data (e.g., position, velocity, and/or attitude) to some or all of the computing devices (e.g., 806, 810A, 810B, and/or 810C).

The computing device 810A may be implemented as any suitable computing device, such as an SVS computing device. As shown in FIG. 10, the computing device 810A may include the elements of the computing device 810 and may include at least one processor 1002, at least one memory 1004, and/or storage 1006, some or all of which may be communicatively coupled at any given time. The processor 1002 may be configured to run various software applications (e.g., an SVS application) or computer code stored (e.g., maintained) in a non-transitory computer-readable medium (e.g., memory 1004 and/or storage 1006) and configured to execute various instructions or operations. The processor 1002 of the computing device 810A may be configured to perform any or all of the operations disclosed throughout. For example, the processor 1002 of the computing device 810A may be configured to: output, to the at least one display 902, a synthetic vision system (SVS) taxi mode exocentric view 202 of an aircraft 306 while the aircraft 306 is performing taxi operations, while the aircraft 306 is on at least one of a taxiway 304 or a runway 302, and until the aircraft 306 is in a predetermined exclusion zone 308, the predetermined exclusion zone 308 including portions of the runway 302 where the aircraft 306 is able to begin taking off; and output, to the at least one display 902, an SVS flight mode egocentric view 102 from the aircraft 306 when the aircraft 306 is in the predetermined exclusion zone 308.

The computing device 810B may be implemented as any suitable computing device. As shown in FIG. 10, the computing device 810B may include the elements of the computing device 810 and may include at least one processor 1002, at least one memory 1004, and/or storage 1006, some or all of which may be communicatively coupled at any given time. The processor 1002 may be configured to run various software applications (e.g., an application) or computer code stored (e.g., maintained) in a non-transitory computer-readable medium (e.g., memory 1004 and/or storage 1006) and configured to execute various instructions or operations. The processor 1002 of the computing device 810B may be configured to perform any or all of the operations disclosed throughout.

The computing device 810C may be implemented as any suitable computing device, such as an FMS computing device. As shown in FIG. 10, the computing device 810C may include the elements of the computing device 810 and may include at least one processor 1002, at least one memory 1004, and/or storage 1006, some or all of which may be communicatively coupled at any given time. The processor 1002 may be configured to run various software applications (e.g., an FMS application) or computer code stored (e.g., maintained) in a non-transitory computer-readable medium (e.g., memory 1004 and/or storage 1006) and configured to execute various instructions or operations. The processor 1002 of the computing device 810C may be configured to perform any or all of the operations disclosed throughout.

For example, at least one processor (e.g., the at least one processor 904, the at least one processor 1002 of the computing device 810A, the at least one processor 1002 of the computing device 810B, and/or the at least one processor 1002 of the computing device 810C) may be configured to: output, to at least one display 902, an SVS taxi mode exocentric view 202 of an aircraft 306 while the aircraft 306 is performing taxi operations, while the aircraft 306 is on at least one of a taxiway 304 or a runway 302, and until the aircraft 306 is in a predetermined exclusion zone 308, the predetermined exclusion zone 308 including portions of the runway 302 where the aircraft 306 is able to begin taking off; and/or output, to the at least one display 902, an SVS flight mode egocentric view 102 from the aircraft 306 when the aircraft 306 is in the predetermined exclusion zone 308.

For example, the at least one processor 904 (e.g., at least one PFD processor) of the display unit computing device 806 may be configured to execute a PFD application 908. The processor 908 may further be configured to: receive sensor data from the sensors 808; receive an auto or off selection from the user interface 804 for a SVS taxi mode; receive a location of the predetermined exclusion zone 308 from the processor 1002 of the computing device 810B; output a scene selection to at least one SVS processor instructing the SVS processor to generate the SVS taxi mode exocentric view 202 or the SVS flight mode egocentric view 102, and receive the SVS taxi mode exocentric view 202 or the SVS flight mode egocentric view 102 from the at least one SVS processor.

For example, the at least one processor 1002 (e.g., at least one SVS processor) of the computing device 810A (e.g., an SVS computing device) may be configured to execute an SVS application. The processor 1002 (e.g., an SVS processor) may further be configured to: receive sensor data from the sensors 808; receive the scene selection from the at least one PFD processor 904; output the SVS taxi mode exocentric view 202 or the SVS flight mode egocentric view 102 to the at least one PFD processor 904; and output a runway database to the processor 1002 of the computing device 810B.

For example, the at least one processor 1002 (e.g., at least one FMS processor) of the computing device 810C (e.g., an FMS computing device) may be configured to execute an FMS application. The processor 1002 (e.g., an FMS processor) may further be configured to: receive sensor data from the sensors 808; output departure runway information to the processor 1002 of the computing device 810B; and output a minimum required takeoff distance to the processor 1002 of the computing device 810B.

For example, the at least one processor 1002 of the computing device 810B may be configured to execute an application. The processor 1002 may further be configured to: receive the runway database from the at least one SVS processor; receive the departure runway information from the at least one FMS processor; receive the minimum required takeoff distance from the at least one FMS processor; determine an exclusion zone 308 resulting in the predetermined exclusion zone 308; and output a location of the predetermined exclusion zone 308 to the at least one PFD processor.

In some embodiments, an FMS may output a departure runway from a flight plan to an application that determines a location of an exclusion zone 308. The FMS may also output a minimum required take-off distance, which may be computed from current aircraft altitude and current barometric conditions. An SVS may output a runway database (e.g., in full or in part based on a current aircraft location) to the application that determines the location of the exclusion zone 308. The application may determine the location of the exclusion zone 308 for the departure runway 302 and output the exclusion zone 308 to a PFD. A user 802 may enable the SVS taxi mode via an Auto/Off selection in the PFD. The PFD may determine the aircraft's 306 position using sensor data. The PFD may use the location of the exclusion zone 308 and a current aircraft position to determine a scene selection indicating whether the SVS should be in flight mode or taxi mode. The PFD may output the scene selection to the SVS. The SVS may generate a synthetic scene (e.g., the SVS taxi mode exocentric view 202 or the SVS flight mode egocentric view 102) and output the synthetic scene to the PFD for presentation on the display 902.

At least one processor (e.g., the at least one processor 904, the at least one processor 1002 of the computing device 810A, the at least one processor 1002 of the computing device 810B, and/or the at least one processor 1002 of the computing device 810C) of the aircraft 306 may be configured to perform (e.g., collectively perform) any or all of the operations disclosed throughout.

Figure 11:
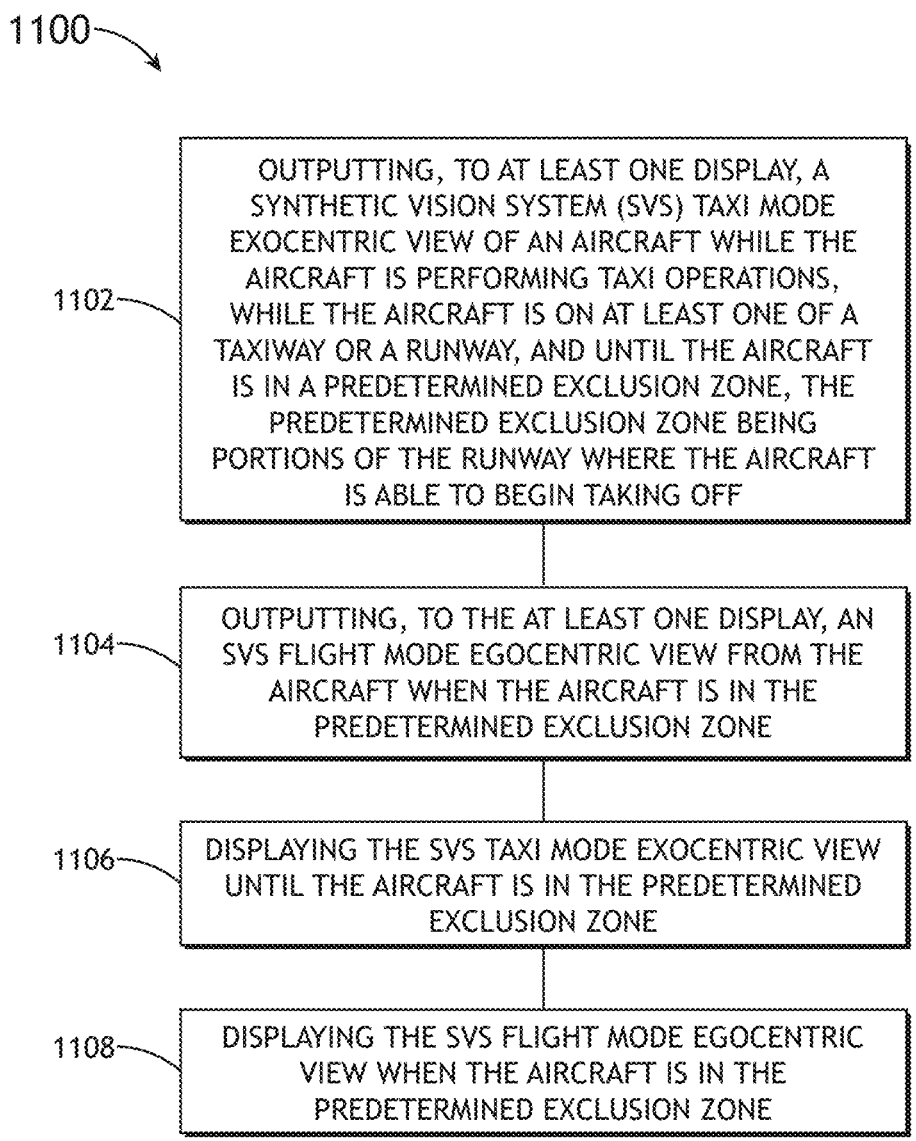
FIG. 11 is a diagram of an exemplary embodiment of a method according to the inventive concepts disclosed herein.

Referring now to FIG. 11, an exemplary embodiment of a method 1100 according to the inventive concepts disclosed herein may include one or more of the following steps. Additionally, for example, some embodiments may include performing one or more instances of the method 1100 iteratively, concurrently, and/or sequentially. Additionally, for example, at least some of the steps of the method 600 may be performed in parallel and/or concurrently. Additionally, in some embodiments, at least some of the steps of the method 1100 may be performed non-sequentially.

A step 1102 may include outputting, to at least one display, a synthetic vision system (SVS) taxi mode exocentric view of an aircraft while the aircraft is performing taxi operations, while the aircraft is on at least one of a taxiway or a runway, and until the aircraft is in a predetermined exclusion zone, the predetermined exclusion zone including portions of the runway where the aircraft is able to begin taking off.

A step 1104 may include outputting, to the at least one display, an SVS flight mode egocentric view from the aircraft when the aircraft is in the predetermined exclusion zone.

A step 1106 may include displaying the SVS taxi mode exocentric view until the aircraft is in the predetermined exclusion zone.

A step 1108 may include displaying the SVS flight mode egocentric view when the aircraft is in the predetermined exclusion zone.

Further, the method 1100 may include any of the operations disclosed throughout.

As will be appreciated from the above, embodiments of the inventive concepts disclosed herein may be directed to a system and a method configured to display an SVS taxi mode exocentric view until an aircraft is in a predetermined exclusion zone and to display an SVS flight mode egocentric view when the aircraft is in the predetermined exclusion zone.

As used throughout and as would be appreciated by those skilled in the art, "at least one non-transitory computer-readable medium" may refer to as at least one non-transitory computer-readable medium (e.g., memory 906, memory 1004, storage 910, and/or storage 1006; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:
1. A system, comprising:
at least one display; and
at least one processor communicatively coupled to the display, the at least one processor configured to:

receive a location of a predetermined exclusion zone determined at least in part by a runway database;

output, to the at least one display, a synthetic vision system (SVS) taxi mode exocentric view of an aircraft while the aircraft is performing taxi operations, while the aircraft is on ground, and when the aircraft is not in the predetermined exclusion zone, the predetermined exclusion zone including portions of a runway where the aircraft is able to begin taking off; and output, to the at least one display, an SVS flight mode egocentric view from the aircraft when the aircraft is in the predetermined exclusion zone, wherein the at least one display is configured to display the SVS taxi mode exocentric view until the aircraft is in the predetermined exclusion zone and to display the SVS flight mode egocentric view when the aircraft is in the predetermined exclusion zone, wherein the predetermine exclusion zone is based at least on a minimum required take-off distance, wherein the minimum required take-off distance is defined as a fraction of a length of the runway, is defined as an aircraft-specific constant, or is calculated by a flight management system (FMS), wherein the SVS taxi mode exocentric view has an eyepoint above and behind the aircraft, wherein the SVS taxi mode exocentric view includes a depiction of the aircraft, wherein the SVS flight mode egocentric view includes primary flight display symbology, wherein the SVS taxi mode exocentric view has less of the primary flight display symbology than the SVS flight mode egocentric view.

2. A method, comprising:

receiving, by at least one processor communicatively coupled to at least one display, a location of a predetermined exclusion zone determined at least in part by a runway database;

outputting, by the at least one processor to the at least one display, a synthetic vision system (SVS) taxi mode exocentric view of an aircraft while the aircraft is performing taxi operations, while the aircraft is on ground, and when the aircraft is not in a predetermined exclusion zone, the predetermined exclusion zone including portions of a runway where the aircraft is able to begin taking off;

outputting, by the at least one processor to the at least one display, an SVS flight mode egocentric view from the aircraft when the aircraft is in the predetermined exclusion zone;

displaying the SVS taxi mode exocentric view until the aircraft is in the predetermined exclusion zone; and displaying the SVS flight mode egocentric view when the aircraft is in the predetermined exclusion zone, wherein the predetermine exclusion zone is based at least on a minimum required take-off distance, wherein the minimum required take-off distance is defined as a fraction of a length of the runway, is defined as an aircraft-specific constant, or is calculated by a flight management system (FMS), wherein the SVS taxi mode exocentric view has an eyepoint above and behind the aircraft, wherein the SVS taxi mode exocentric view includes a depiction of the aircraft, wherein the SVS flight mode egocentric view includes primary flight display symbology, wherein the SVS taxi mode exocentric view has less of the primary flight display symbology than the SVS flight mode egocentric view.

3. The system of claim 1, wherein the minimum required take-off distance is defined as the fraction of the length of the runway.

4. The system of claim 1, wherein the minimum required take-off distance is calculated by the FMS.

5. The system of claim 1, wherein the minimum required take-off distance is defined as the aircraft-specific constant.

6. The system of claim 1, wherein the at least one processor comprises: at least one primary flight display (PFD) processor configured to execute a PFD application, at least one SVS processor configured to execute an SVS application, at least one flight management system (FMS) processor configured to execute an FMS application, and at least one other processor configured to execute an application.

7. The system of claim 6, wherein the at least one PFD processor is further configured to: receive sensor data from sensors; receive an auto selection for a SVS taxi mode; receive the location of the predetermined exclusion zone from the at least one other processor; output a scene selection to the at least one SVS processor instructing the SVS processor to generate the SVS taxi mode exocentric view or the SVS flight mode egocentric view, and receive the SVS taxi mode exocentric view or the SVS flight mode egocentric view from the at least one SVS processor.

8. The system of claim 1, wherein a pilot of the aircraft is able to make an auto selection for a SVS taxi mode, wherein the auto selection of the SVS taxi mode enables the at least one processor to automatically transition between the SVS taxi mode exocentric view and the SVS flight mode egocentric view.

9. The system of claim 7, wherein the at least one SVS processor is further configured to: receive sensor data from the sensors;

receive the scene selection from the at least one PFD processor; output the SVS taxi mode exocentric view or the SVS flight mode egocentric view to the at least one PFD processor; and output the runway database to the at least one other processor.

10. The system of claim 9, wherein the at least one FMS processor is further configured to: receive sensor data from the sensors;

output departure runway information to the at least one other processor; and output the minimum required take-off distance to the at least one other processor.

11. The system of claim 10, wherein the at least one other processor is further configured to: receive the runway database from the at least one SVS processor; receive the departure runway information from the at least one FMS processor; receive the minimum required take-off distance from the at least one FMS processor; determine an exclusion zone resulting in the predetermined exclusion zone; and output the location of the predetermined exclusion zone to the at least one PFD processor.

* * * * *